United States Patent [19]

Bruening et al.

[11] Patent Number: 5,446,182
[45] Date of Patent: Aug. 29, 1995

[54] PROCESS OF REMOVING IONS FROM SOLUTIONS USING A COMPLEX WITH SULFUR-CONTAINING HYDROCARBONS ALSO CONTAINING ELECTRON WITHDRAWING GROUPS BONDED TO A SOLID HYDROPHILIC MATRIX

[75] Inventors: Ronald L. Bruening, Sandy; Bryon J. Tarbet, Highland; Reed M. Izatt; Jerald S. Bradshaw, both of Provo, all of Utah

[73] Assignee: Brigham Young University, Provo, Utah

[21] Appl. No.: 197,287

[22] Filed: Feb. 15, 1994

Related U.S. Application Data

[62] Division of Ser. No. 1,334, Jan. 7, 1993, which is a division of Ser. No. 895,341, Jun. 8, 1992, Pat. No. 5,190,661.

[51] Int. Cl.$^6$ .............................. C07F 7/08; C07F 7/10
[52] U.S. Cl. ........................................ 556/427; 556/418; 556/413; 556/422; 556/423; 556/428; 556/436; 556/437; 556/411.5; 546/14; 549/4; 549/214; 548/110; 544/229
[58] Field of Search ................. 556/413, 14, 423, 427, 556/445, 419, 422, 428, 436, 437; 549/214, 4; 548/110; 544/229

[56] References Cited

U.S. PATENT DOCUMENTS 5,294,622  3/1994  Dreikorn et al. ................ 546/14 X
5,321,066  6/1994  Carrozza et al. ................ 546/14 X
5,322,953  6/1994  Lee et al. ............................ 549/214
5,324,710  6/1994  Ort et al. ..................... 544/229 X

*Primary Examiner*—Paul F. Shaver
*Attorney, Agent, or Firm*—Thorpe, North & Western

[57] ABSTRACT

A method for the removal and concentration of desired ions such as Pd(II), Ru(III), Pd(IV), Au(III), Au(I), Ag(I), and Hg(II) from a multiple ion source solution which may contain larger concentrations of other undesired ions including H$^+$ comprises bringing the source solution into contact with a compound comprising a sulfur and electron withdrawing group containing ligand covalently bonded through an organic spacer silicon grouping to a solid inorganic support. The sulfur and electron withdrawing group containing ligand portion(s) of the compound has an affinity for the desired ions to form a complex thereby removing the desired ions from the source solution. The desired ions are removed from the compound by contacting the compound with a much smaller volume of a receiving solution having a greater affinity for the desired ions than does the sulfur and electron withdrawing group containing ligand portion of the compound. The process is useful in removing desired or unwanted ions from acidic waste streams, metal refining streams, and other industrial or environmental streams. The invention is also drawn to the sulfur and electron withdrawing group containing ligands covalently bonded through a spacer grouping to a hydrophilic inorganic solid support material.

10 Claims, No Drawings

PROCESS OF REMOVING IONS FROM SOLUTIONS USING A COMPLEX WITH SULFUR-CONTAINING HYDROCARBONS ALSO CONTAINING ELECTRON WITHDRAWING GROUPS BONDED TO A SOLID HYDROPHILIC MATRIX

This application is a divisional of application Ser. No. 08/001,334 filed Jan. 7, 1993 which is a divisional of application Ser. No. 07/895,341 filed Jun. 8, 1992 now U.S. Pat. No. 5,190,661.

FIELD OF THE INVENTION

This invention relates to sulfur-containing hydrocarbons which also contains electron withdrawing groups covalently bonded to a silane, such as a trialkoxysilane, and to such intermediate compounds which are covalently bonded to hydrophilic solid supports and to processes for removing, separating and concentrating certain desired ions from solutions wherein such ions may be admixed with other ions which may be present in much higher concentrations by the use of such sulfur-containing hydrocarbons containing electron withdrawing groups bonded to such solid supports. More particularly, this invention relates to a process for removing such ions from an admixture with others in solution by forming a complex of the desired ions with compounds composed of sulfur-containing hydrocarbons containing electron withdrawing groups bonded to such solid supports by flowing such solutions through a column packed with such sulfur-containing hydrocarbons containing electron withdrawing group solid supported materials and then selectively breaking the complex of the desired ion from the compounds to which such ion has become attached by flowing a receiving liquid in much smaller volume than the volume of solution passed through the column to remove and concentrate the desired ions in solution in the receiving liquid. The concentrated ions thus removed may then be recovered by known methods.

BACKGROUND OF THE INVENTION

Effective methods for the recovery and/or separation of particular ions such as ruthenium, palladium, gold, silver, and mercury ions in either cation or complex anion form from solutions thereof, admixed with chelating agents and/or other ions which may be present, represent a real need in modern technology. As specific examples, efficient and economical separation of (1) small amounts of Ru, Pd, Au, Ag, from industrial concentrates; (2) separation of Ru, Pd, Au, and Ag, from solutions containing large amounts of base metals; and (3) separation of Hg as toxic wastes from acidic solutions, all represent real separation needs with presently either unsatisfactory technologies for their accomplishment, or for which more economical technologies are desired. These ions are often present at low concentrations in solutions containing other ions at much greater concentrations. Hence, there is a real need for a process to selectively concentrate and recover these ions.

The fact is known that macrocyclic polythioethers and certain other sulfur-containing hydrocarbon ligands present as solutes in a solvent such as water are characterized by their ability to selectively form strong bonds with the noble metal, platinum group metal, and mercury ions or groups of these ions present as solutes in the same solvent as described in articles by R. M. Izatt, et al. A CALORIMETRIC TITRATION STUDY OF UNI-AND BIVALENT METAL ION INTERACTION WITH SEVERAL THIA DERIVATIVES OF 9-CROWN-3, 12-CROWN-4, 15-CROWN-5, 18-CROWN-6, 24-CROWN-8 AND WITH SEVERAL OXATHIAPENTADECANES IN WATER OR WATER-METHANOL SOLVENTS AT 25° C., *Inorganica Chemica Acta*, 30:1–8 (1978) for the complexation of silver and mercury ions by open chain sulfur-containing hydrocarbons and by S. R. Cooper, CROWN THIOETHER CHEMISTRY, *Account of Chemical Research*, 21:141–146 (1988) for the complexation of rhodium and silver ions by macrocyclic sulfur-containing ligands.

Articles such as those entitled SILANE COMPOUNDS FOR SILYLATING SURFACES by E. P. Plueddemann, in "Silanes, Surfaces and Interfaces Symposium, Snowmass, 1985," Ed. by D. E. Leyden, Gordon and Breach, Publishers, pp. 1–25 (1986) and SILANE COUPLING AGENTS by E. P. Plueddemann, Plenum Press, pp. 1–235 (1982) list many different types of organic materials which have been attached to silane compounds and discuss some of their properties.

Bradshaw, et al., U.S. Pat. No. 4,959,153 describe certain sulfur containing hydrocarbons covalently bonded to a hydrophilic solid support which can be used to selectively bind noble and platinum group metals as well as some transition metals. In many cases these prior art sulfur-containing hydrocarbons can be eluted using one or two eluents such as amines or $CN^-$ which are not always desirable eluents.

These prior art compositions do not provide the means for selecting the desired interactive strength between the ions to be removed and the ligands to which they are to be bound for removal. Hence the sought for selectivity for ion removal and subsequent elution from the binding ligands is not always achieved.

The compositions described herein accomplish these desirable objectives by a controlled reduction of the interaction strength via the appropriate addition of electron withdrawing groups of varying strength.

SUMMARY OF THE INVENTION

The unique properties of the sulfur-containing plus electron withdrawing group containing compositions described herein often show greater selectivity amongst the platinum and noble metals and also over the transition metals than the materials in the prior art. Furthermore, the binding strength of these new materials is sufficient to remove ions such as Ru, Pd, Au, Ag, and Hg in many matrices even when present at very low levels and subsequently elute the purified Ru, Pd, Au, Ag, Hg, or other ions using a variety of aqueous eluents such as $NO_2^-$, $SO_3^{2-}$, EDTA, DTPA, NTA, $Br^-$ and $I^-$ as well as $NH_3$, amines, thiourea and $CN^-$. Those indicated as ions may be used in acid or salt form. Therefore, sulfur-containing plus electron withdrawing hydrocarbon ligands as attached to appropriate inorganic solid supports form the basis of the present invention. The compounds, methods of synthesis and properties are described below. The invention also encompasses processes for using the compounds for the separation of desired ions.

The compounds of the present invention comprise suitable sulfur containing electron withdrawing ligands which are covalently bonded through a spacer grouping to a silicon atom and further covalently bonded to a solid support.

The intermediate groups comprise sulfur-containing hydrocarbons which also contain electron withdrawing groups covalently bonded to a silane and are represented by the following Formula I:

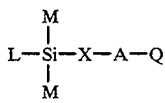

wherein L is a member independently selected from the group consisting of Cl, Br, I, alkyl, alkoxy, substituted alkyl or substituted alkoxy. When L is not alkoxy it is classified as a leaving group. M can be either L or -X-A-Q. Preferably L will be methoxy. X is any suitable spacer group which allows the A-Q group to be unencumbered when attached to a solid support. X can be any spacer member selected from the group consisting of either (1) groups having the formula:

wherein $R^1$ is a member selected from the group consisting of H, SH, OH, lower alkyl, and aryl, such as phenyl, naphthyl and pyridyl; a is an integer from 2 to about 10; b is an integer of 0 or 1; (2) phenylene or (3) is a methacryl group. Preferably X is a glycidoxypropyl group where a is 3, b is 1 and $R^1$ is OH. A is a member selected from the group consisting of S, O, $NR^2$, and $CH_2$, wherein $R^2$ is a member selected from the group consisting of H and lower alkyl with the proviso that A must be S if Q does not contain an S atom and A must be $CH_2$ when Ar is 2-furyl, 2-thienyl or 2-pyrryl. A is preferably S. Q is a member selected from the group consisting of Ar or a lower alkyl. Ar is an aryl group selected from the group consisting of phenyl, thiophenyl, naphthyl, biphenyl, pyridyl, pyrimidinyl, pyrazyl, pyridazinyl, furyl, thienyl, pyrryl, quinolinyl and bipyridyl. The Ar groups are in themselves electron withdrawing and may be unsubstituted. However, the lower alkyl groups must contain electron withdrawing substituents unless the X group is phenylene. Both the Ar and lower alkyl groups may contain electron withdrawing groups selected from the group consisting of amido, aldehyde, ketone, sulfonyl, carboxyl, benzene, I, Br, Cl, F, cyano and nitro and mixtures thereof. When Q is Ar these groups can, if desired, be separated from the Ar group by an alkyl spacer which may lessen the electron withdrawing capability. Further, the Ar rings and lower alkyl groups can be entirely substituted if desired, e.g. Ar could be 2,3,4,5,6 pentachlorobenzene with A being S and a halo group separated from Ar by an alkyl spacer could be a perhalo group. The A-Q group must contain at least one S atom and, when Q is Ar, preferably one or more of the above named substituents will be present as they are electron withdrawing groups and serve to regulate the log K value between the sulfur and the metal ion being concentrated or removed. By controlling the electron density at the sulfur, the binding capacity and selectivity of the A-Q ligand can be regulated. As stated above, when furyl, thienyl, pyrryl are attached to the A group via their 2 position the A group must be $CH_2$. The term lower alkyl refers to alkyl groups having from 1 to 6 carbon atoms.

The compositions used for the concentration and/or separation of the Au, Ag, Pd, Ru and Hg ions are made by reacting a Formula I compound with a solid matrix selected from the group consisting of sand, silica gel, glass, glass fibers, alumina, zirconia, titania and nickel oxide or other hydrophilic inorganic supports and mixtures thereof to form a compound of Formula II:

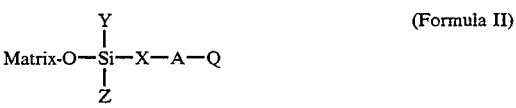

wherein X, A and Q have the meanings given above, Matrix is a member selected from the group consisting of sand, silica gel, glass, glass fibers, alumina, zirconia, titania and nickel oxide or other hydrophilic inorganic supports and mixtures thereof and Y and Z are each members selected from the group consisting of O-Matrix, L or -X-A-Q. When Y and Z moieties L they are functionally classified as leaving groups, i.e. groups attached to the silicon atom which, when reacted with an O-solid hydrophilic matrix material, may leave or be replaced by the O-Matrix. If any such functional leaving groups are left over after reacting a silicon containing spacer group or spacer/ligand group with the solid hydrophilic matrix support material, these groups will have no direct function in the interaction between the desired ion and the sulfur containing electron withdrawing A-Q hydrocarbon ligand attached to the solid support.

As referred to above, X is a spacer grouping which is of a functional nature that it is sufficiently hydrophilic to function in an aqueous environment and will separate the ligand from the solid matrix support surface to maximize the interaction between the ligand and desired ion being separated. Representative of X are members such as glycidoxypropyl, ethyl, propyl, phenyl and methacryl.

The ligands used in the present invention, combining the presence of sulfur and electron withdrawing groups, wherein the ligands are covalently bonded via a spacer grouping to solid supports as shown in Formula II are characterized by high selectively for and removal of desired ions or groups of desired ions such as $Pd^{4+}$, $Pd^{2+}$, $Ru^{3+}$, $Au^{3+}$, $Au^+$, $Ag^+$, and $Hg^{2+}$, even when present at low concentrations, from the source phase solution containing a mixture of these metal ions with the ions one does not desire to remove (i.e. referred to as "undesired ions") present in much greater concentrations in the solution. The separation is accomplished, even in the presence of other complexing agents or matrix constituents, particularly acids, in a separation device, such as a column, through which the solution is flowed. The process of selectively removing and concentrating the desired ion(s) is characterized by the ability to quantitatively complex from a larger volume of solution the desired ion(s) when they are present at low concentrations. The desired ions are recovered from the separation column by flowing through it a small volume of a receiving phase which contains a solubilizing reagent which need not be selective, but which will strip the desired ions from the ligand quantitatively. Other equivalent apparatus may be used instead of a column, e.g., a slurry which is filtered, washed with a receiving liquid to break the complex and recover the desired ion. The recovery of the desired metal ions from the receiving phase is readily accomplished by known procedures.

As previously stated, Bradshaw et al., U.S. Pat. No. 4,959,153 teach that sulfur-containing hydrocarbons covalently bonded to a hydrophilic solid support without electron withdrawing group(s) can be used to selectively bind noble and platinum group metals as well as some transition metals. However, the sulfur-containing plus electron withdrawing groups of the present invention often show greater selectivity amongst the platinum and noble metal groups, i.e. Au, Ag, Pd and Ru and also over some transition metals, i.e. Hg, than the materials in the '153 patent. Furthermore, the binding strength of the ligands of the present invention is sufficient to remove ions such as Ru, Pd, Au, Ag, and Hg in many matrices even when present at very low levels and subsequently elute the purified Ru, Pd, Au, Ag, Hg, or other ions using a variety of eluents such as $NO_2^-$, $SO_3^{2-}$, EDTA, DTPA, NTA, $Br^-$ and $I^-$ as well as $NH_3$, amines, thiourea and $CN^-$. In many cases the sulfur-containing hydrocarbon ligands, not containing electron-withdrawing groups described previously by Bradshaw et al. can be eluted using a limited number of eluents such as amines or $CN^-$ which are not always desirable eluents. The compositions described herein accomplish these desirable objectives by a controlled reduction of the interaction strength between the ligand and the metal being removed via the appropriate addition of the electron withdrawing groups.

Examples of electron withdrawing groups which can be used are the amido, aldehyde, ketone, sulfonyl, carboxyl, benzene, I, Br, Cl, F, cyano and nitro groups. These groups can, if desired, be separated from the Ar group by an alkyl spacer which, in the case of the halo substituents can result in a perhaloalkyl group. More than one electron withdrawing groups can also be added to perform a larger overall combined reduction of the interaction ability of the ligand. In general, the strength of the withdrawing groups increase in the order of amido, aldehyde, ketone, sulfonyl, carboxyl, benzene, I, Br, Cl, F, cyano and nitro. The use of alkyl spacers may somewhat diminish the electron withdrawing capability. The stronger withdrawing groups are used to make greater reductions in the interaction strength of the ligands. Positioning of the withdrawing groups can also be used to control the interaction constant. For example, in adding monochloro substituted benzene withdrawing groups, the chloro group increases in withdrawl capability in the order of meta, ortho and para positions.

These parameters allow for myriad ligand combinations possessing a variety of interaction strengths to be synthesized for selective ion removal. This further provides for ligand choices to be made for use with a variety of eluents of varying selectivity and interaction strength properties.

DETAILED DESCRIPTION OF THE PREFERRED EMBODIMENT OF THE INVENTION

As summarized above, the present invention is drawn to novel sulfur and electron withdrawing group containing ligands covalently bound through a spacer to a silicon moiety as shown in Formula I and further to such intermediate compounds attached to a solid matrix or support, as shown in Formula II. The invention is also drawn to the concentration and removal of certain desired ions such as $Pd^{4+}$, $Pd^{2+}$, $Ru^{3+}$, $Au^{3+}$, $Au^+$, $Ag^+$, and $Hg^{2+}$ from other ions. For example, effective methods of recovery and/or separation of metal ions from other metal ions, such as (1) the small amounts of Ru, Pd, au and Ag from Rh and/or Ir concentrates; (2) separation of Pd, Ru, Au and/or Ag from solutions containing large amounts of base metals; and (3) separation of Hg as toxic wastes from acidic solutions represent a real need for which there are no established procedures for satisfactory selective removal. Such solutions from which such ions are to be concentrated and/or recovered are referred to herein as "source solutions." In many instances the concentration of desired ions in the source solutions will be much less than the concentration of other or undesired ions from which they are to be separated.

The concentration of desired ions is accomplished by forming a complex of the desired ions with a compound shown in Formula II by flowing a source solution containing the desired ions through a column packed with a Formula II compound to attract and bind the desired ions to the ligand portion of such compound and subsequently breaking the ligand compound-complex by flowing a receiving liquid having a much smaller volume than the volume of source solution passed through the column to remove and concentrate the desired ions in the receiving liquid solution. The receiving liquid or recovery solution forms a stronger complex with the desired ions than does the ligand portion of a Formula II compound and thus the desired ions are quantitatively stripped from the ligand in concentrated form in the receiving solution. The recovery of desired ions from the receiving liquid is accomplished by known methods.

The sulfur and electron withdrawing group containing ligand compounds, as represented by Formulas I and II, may be prepared by various methods which are illustrated in the examples which follow. In each of these examples the silane and X or "spacer" combination is 3-glycidoxypropyltrimethoxysilane resulting in an intermediate of following Formula III:

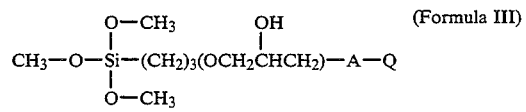

Also, in the following examples, a compound of Formula III, is reacted with silica gel resulting in an -A-Q ligand bound through the 3-glycidoxypropyltrimethoxysilane to a silica gel matrix having the general Formula IV:

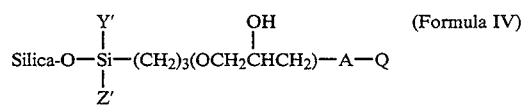

wherein Y' and Z' are each members selected from the group consisting of methoxy or O-Silica.

The following examples are given to illustrate compounds which have been made in accordance with Formula IV. These examples are illustrative only, and are not comprehensive of the many different compounds which have been or can be made within the scope of the present invention. The silica matrix can be replaced by various other solid supports and the spacer or X group can also be varied. Moreover, there are myriad -A-Q ligands which may be utilized to take advantage of their selectivity for a desired ion.

EXAMPLE 1

In this example the A group is S and the Q group is phenyl. Thiophenol, as the ligand grouping, was attached to the surface of silica gel via glycidoxypropyltrimethoxysilane in the following manner. First, 2 grams of reagent grade thiophenol were dissolved in 10 mL of methanol in which had been dissolved 0.2 g of sodium metal. This mixture was slowly added to a three-necked round bottom flask equipped with a mechanical stirrer containing 20 mL of toluene and 4.3 g of 3-glycidoxypropyltrimethoxysilane at 75° C. The reaction was allowed to proceed overnight thereby forming an intermediate corresponding to Formula III where A is S and Q is phenyl. To the intermediate was added 18 g of silica gel (250–500μ particles). Again the mixture was stirred and heated at 60–80° C. overnight. The final product was isolated by filtration and dried before testing for capacity as a ligand for selective ion removal.

EXAMPLE 2

The procedure of Example 1 above was followed with the exception that 4-chlorothiophenol was used in place of the thiophenol. In this Example the Cl atom was contained on the phenyl group as an electron withdrawing moiety. The mole ratio of thiophenol to silane was kept at 1:1.02. The final product was again filtered and dried thoroughly before testing.

EXAMPLE 3

The procedure of Example 2 above was followed except that the 3-chlorothiophenol isomer was used as the reactant in place of the 4-chlorothiophenol.

EXAMPLE 4

The procedure of Example 2 was again used except that 4-fluorothiophenol was used as the reactant in place of the 4-chlorothiophenol thereby resulting in a composition where F is attached to the phenyl group as an electron withdrawing moiety.

EXAMPLE 5

This example was the same as Example 2 above except that 3,4-dichlorothiophenol was used as the reactant in place of the 4-chlorothiophenol thereby resulting in a composition containing two adjacent Cl atoms on the phenyl group as electron withdrawing moieties.

EXAMPLE 6

This example is the same as Example 2 above except that 4-nitrothiophenol was used as the reactant in place of the 4-chlorothiophenol thereby resulting in a $NO_2$ electron withdrawing moiety on the phenyl group.

EXAMPLE 7

This example is the same as Example 2 above except that the isomeric 2-chlorothiophenol was used as the reactant in place of the 4-chlorothiophenol.

EXAMPLE 8

This example is the same as Example 5 except that 2,6-dichlorothiophenol was used as the reactant in place of the 3,4-dichlorothiophenol.

EXAMPLE 9

This example is the same as Example 2 above except that 2-mercaptopyrimidine was used as the reactant in place of the 4-chlorothiophenol thereby resulting in a composition where A is S and Q is pyrimidinyl.

EXAMPLE 10

This example is the same as Example 2 except that 2-mercaptoacetic acid was used as the reactant in place of the 4-chlorothiophenol thereby resulting in a composition where A is S and Q is $CH_2COOH$, e.g. a methyl group having a carboxyl electron withdrawing group attached.

EXAMPLE 11

This example is the same as Example 2 above except that thiosalicylic acid was used as the reactant in place of the 4-chlorothiophenol and the solvent in this case was ethanol. Water was also added just before the silica gel to increase the solubility of the intermediate. In this composition A is S and Q is phenyl having a carboxyl group attached.

EXAMPLE 12

In this example a disubstituted silicon intermediate is prepared by reacting tetramethoxysilane with the Grignard reagent prepared from 4-bromo-thioanisole and magnesium. The Grignard reagent is present at a 2:1 ratio compared to the silane. This results in a disubstituted silicon intermediate which may be purified by distillation under high vacuum. The intermediate is then bonded to silica gel in the manner described above. This results in a composition according to Formula II wherein Matrix is O-Silica, Y is X-A-Q, wherein X is phenyl, A is S and Q is methyl and Z is methoxy or O-Matrix. If desired Z can also be -X-A-Q by using a 3:1 ratio of Grignard reagent to silane.

METAL ION RECOVERY AND CONCENTRATION PROCESS

The process of selectively and quantitatively concentrating and removing a desired ion or group of desired ions present at low concentrations from a plurality of other undesired ions in a multiple ion source solution in which the undesired ions, along with acid(s) and other chelating agents may be present at much higher concentrations, comprises bringing the multiple ion containing source solution into contact with a sulfur and electron withdrawing group containing ligand matrix supported compound as shown in Formula II which causes the desired ion(s) to complex with the sulfur and electron withdrawing group containing ligand portion of the compound and subsequently breaking or stripping the desired ion from the complex with a receiving solution which forms a stronger complex with the desired ions than does the sulfur and electron withdrawing group containing ligand or which forms a stronger complex with the sulfur and electron withdrawing group containing ligand. The receiving or recovery solution contains only the desired ions in a concentrated form.

The sulfur and electron withdrawing group containing ligand solid matrix support functions to attract the desired ions (DI) according to Formula V:

$$(\text{Matrix-O})_{1\text{-}3}\text{-Si-X-A-Q} + \text{DI} \rightarrow (\text{Matrix-O})_{1\text{-}3}\text{-Si-X-A-Q: DI}$$

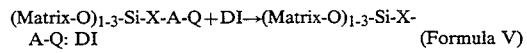

Except for DI, Formula V is an abbreviated form of Formula II or Formula IV wherein A-Q stands for the sulfur and electron withdrawing group containing ligand. DI stands for desired ion being removed. When Matrix-O is less than three the other positions are taken by Y and Z or Y' and Z' groups as described above.

Once the desired ions are bound to the sulfur and electron withdrawing group containing ligand, they are subsequently separated by use of a smaller volume of a receiving liquid according to Formula VI:

$$(\text{Marix-O})_{1\text{-}3}\text{-Si-X-A-Q:DI} + \text{RL} \rightarrow$$
$$(\text{Matrix-O})_{1\text{-}3}\text{-Si-X-A-Q} + \text{RL:DI} \qquad \text{(Formula VI)}$$

where RL stands for the receiving liquid.

The preferred embodiment disclosed herein involves carrying out the process by bringing a large volume of the source multiple ion solution, which may contain hydrogen ions and may also contain chelating agents, into contact with a sulfur and electron withdrawing group containing ligand-solid support compound of Formula II or IV in a separation column through which the mixture is first flowed to complex the desired metal ions (DI) with the sulfur and electron withdrawing group containing ligand-solid support compound as indicated by Formula II or IV above, followed by the flow through the column of a smaller volume of a receiving liquid (RL), such as aqueous solutions of $NO_2^-$, $SO_3^{2-}$, EDTA, DTPA, NTA, $Br^-$ and $I^-$ as well as $NH_3$, amines, thiourea and $CN^-$. As specific examples are aqueous $K_2SO_3$, $NH_3$, EDTA, $NaNO_2$ and HBr, and others which form a stronger complex with the desired ion than does the sulfur and electron withdrawing group containing ligand bound to the solid support or forms a stronger complex with the sulfur and electron withdrawing group containing ligand bound to solid support than does the desired ion. In this manner the desired ions are carried out of the column in a concentrated form in the receiving solution as indicated by Formula VI. The degree or amount of concentration will obviously depend upon the concentration of desired ions in the source solution and the volume of source solution to be treated. The specific receiving liquid being utilized will also be a factor. The receiving liquid does not have to be specific to the removal of the desired ions because no other ions will be complexed to the ligand. Generally speaking the concentration of desired ions in the receiving liquid will be from 20 to 1,000,000 times greater than in the source solution. Other equivalent apparatus may be used instead of a column, e.g., a slurry which is filtered which is then washed with a receiving liquid to break the complex and recover the desired ion(s). The concentrated desired ions are then recovered from the receiving phase by known procedures.

Illustrative of desired ions which have strong affinities for sulfur and electron withdrawing group containing ligands bound to solid supports are Pd(II), Ru(III), Pd(IV), Au(III), Au(I), Ag(I), and Hg(II). This listing of preferred ions is not comprehensive and is intended only to show the types of preferred ions which may be bound to sulfur and electron withdrawing group containing ligands attached to solid supports in the manner described above. The affinity of the ligand to the ions will obviously vary depending upon the ion and the ligand configuration. Hence it is possible that, even in the above listing, those ions having the stronger affinity for the ligand will be selectively removed from other ions in the listing which have a weaker affinity for the particular ligand. Hence, by proper choice of ligands and makeup of the source solution it is also possible to separate and concentrate one desired ion from another.

Therefore, the terminology "desired ions" and "undesired ions" is relative and the ion having the stronger affinity to the ligand will generally be the "desired" ion.

The process of the invention is particularly adaptable to the removal of Pd(II), Ru(III), Ag(I), Au(III), and/or Hg(II) ions from source solutions from other metal ions in water supplies, waste solutions, deposits and industrial solutions and silver recovery from waste solutions, e.g., from emulsions on photographic and X-ray film.

Removal of Desired Molecules With Ligand-Matrix Compounds

The following examples demonstrate how the sulfur and electron withdrawing group containing ligand bound to a solid support compound of Formula II or Formula IV may be used to concentrate and remove desired ions. The sulfur and electron withdrawing group containing ligand containing solid support compound is placed in a column. An aqueous source solution containing the desired ion or ions, in a mixture of other undesired ions and/or chelating agents which may be in a much greater concentration, is passed through the column. The flow rate for the solution may be increased by applying pressure with a pump on the top or bottom of the column or applying a vacuum in the receiving vessel. After the source solution has passed through the column, a much smaller volume of a recovery solution, i.e. an aqueous solution, which has a stronger affinity for the desired ions than does the ligand, is passed through the column. This receiving solution contains only the desired ion(s) in a concentrated form for subsequent recovery.

The following examples of separations and recoveries of ions by the inorganic support-bound sulfur and electron withdrawing group containing ligands which were made as described in Examples 1 through 11 are given as illustrations. These examples are illustrative only, and are not comprehensive of the many separations of ions that are possible using the materials of Formula II. However, separation of other desired ions may be accomplished as in the following examples and the exact process or procedure to be followed can be readily determined by one skilled in the art.

EXAMPLE 13

In this example, 2 grams of the silica gel-bound sulfur plus benzene electron withdrawing group containing ligand of Example 1 were placed in a column. A 1000 ml solution of 3 ppm Hg in 1M aqueous $HNO_3$ was passed through the column using a vacuum pump. The column was then washed with 25 ml of $H_2O$ to remove the $HNO_3$. Finally the Hg was eluted using 10 ml of 6M HCl. An analysis of the recovery solution by atomic absorption spectroscopy (AA) showed that greater than 95% of the Hg originally in the 1000 ml Hg solution was in the 10 ml recovery solution.

EXAMPLE 14

In this example, separate runs are made using 2 grams of the silica gel sulfur-containing hydrocarbon including the chlorobenzene electron withdrawing groups of Examples 2, 3, 5, 7 and 8. The composition is placed in a column and a 250 ml solution of 100 ppm $Pd^{2+}$ in 9M aqueous HCl, 0.1M aqueous $CuCl_2$, 1M aqueous $FeCl_3$, 1000 ppm $Pt^{2+}$ and 0.5M aqueous $NiCl_2$ is passed through the column using a vacuum pump to increase the flow rate. The loading solution is washed out of the column with 25 ml of 0.1M HCl being passed through the column. Then a 10 ml solution of 0.5M aqueous $K_2SO_3$ is passed through the column. An analysis of the recovery solution by inductively coupled plasma spectroscopy (ICP) in each instance shows that greater than 99% of the $Pd^{2+}$ originally in the 250 ml Pd solution is in the 10 ml recovery solution and that less than 1 ppm of Cu, Fe, Pt, or Ni is present in the recovery solution.

EXAMPLE 15

In this example 2 grams of the silica gel-bound sulfur plus nitrobenzene electron withdrawing group hydrocarbon of Example 6 are placed in a column. A 250 ml sample of the Pd, Cu, Fe, Pt and Ni containing solution identical to that in Example 13 is passed through the column. The column is washed with 25 ml of 0.1M HCl and then eluted with 10 ml of 5M HBr. ICP analysis of the recovery solution shows that greater than 99% of the Pd from the original loading solution and less than 1 ppm, Cu, Fe, Pt, or Ni is present in the 10 ml recovery solution.

EXAMPLE 16

In this example, 2 grams of the silica gel-bond sulfur plus carboxylic acid electron withdrawing group hydrocarbon of Example 10 are placed in a column. A 1000 ml solution of 10 ppm, $Ag^+$ in 5M $HNO_3$ is passed through the column using a vacuum pump. A 25 ml solution of $H_2O$ is passed through the column to wash the $HNO_3$ out. A 10 ml solution of 6M HCl is passed through the column. ICP analysis of the recovery solution indicates greater than 95% of the Ag from the original solution is in the 10 ml recovery solution.

EXAMPLE 17

In this example, 2 grams of the silica gel-bound sulfur plus carboxylic acid benzene electron withdrawing group containing hydrocarbon of Example 11 are placed in a column. A 250 ml solution of 200 ppm Au-(III) in 6M aqueous HCl is passed through the column. The column is washed with 25 ml of $H_2O$ and the Au is then eluted using 10 ml of 5M NaI. Analysis of the recovery solution by AA shows that greater than 99% of the Au originally in the 250 ml solution is in the 10 ml recovery solution.

Although the invention has been described and illustrated by reference to certain specific silica gel-bound sulfur and electron withdrawing group containing ligands falling within the scope of Formula II and the process of using them, other analogs of these sulfur and electron withdrawing group containing ligand compounds also falling within the scope of Formula II are also within the scope of the invention as are processes of using them to separated and recover desired ions. The invention is therefore limited only in scope by the following claims and functional equivalents thereof.

We claim:

1. A compound comprising a sulfur and electron withdrawing group containing ligand-covalently bonded to a silane spacer grouping having the formula:

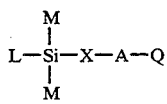

wherein
(i) L is a member independently selected from the group consisting of Cl, Br, I, alkyl, alkoxy, substituted alkyl or substituted alkoxy;
(ii) M is a member selected from the group consisting of L and -X-A-Q;
(iii) X can be any spacer member selected from the group consisting of (1) groups having the formula:

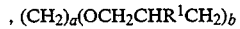

wherein $R^1$ is a member selected from the group consisting of H, SH, OH, lower alkyl, and aryl; a is an integer from 2 to about 10 and b is an integer of 0 or 1, (2) phenyl and (3) methacryl;
(iv) A is a member selected from the group consisting of S, O, $NR^2$, and $CH_2$, wherein $R^2$ is a member selected from the group consisting of H and lower alkyl with the proviso that A must be S when Q does not contain an S atom;
(v) Q is a member selected from the group consisting of Ar and lower alkyl with the provisos that (l) Q must be electron withdrawing when X is other than phenyl (2) must contain an S atom when A does not and (3) wherein Ar is an aromatic group selected from the group consisting of phenyl, thiophenyl, naphthyl, biphenyl, pyridyl, pyrimidinyl, pyrazyl, pyridazinyl, furyl, thienyl, pyrryl, quinolinyl and bipyridyl; and
(vi) with the further proviso that A must be $CH_2$ when Q is Ar selected from the group consisting of 2-furyl, 2-thienyl and 2-pyrryl.

2. A compound according to claim 1 wherein A is S.

3. A compound according to claim 2 wherein Q contains at least one electron withdrawing substituent selected from the group consisting of amido, aldehyde, ketone, sulfonyl, carboxyl, phenyl, I, Br, Cl, F, cyano and nitro and mixtures thereof.

4. A compound according to claim 3 wherein X is a group having the formula $(CH_2)_a(OCH_2CHR^1CH_2)_b$ wherein a is 3, $R^1$ is OH and b is 1.

5. A compound according to claim 4 wherein Q is phenyl.

6. A compound according to claim 4 wherein Q is halo substituted phenyl.

7. A compound according to claim 4 wherein Q is nitro substituted phenyl.

8. A compound according to claim 4 wherein Q is carboxyl substituted phenyl.

9. A compound according to claim 4 wherein Q is carboxyl substituted lower alkyl.

10. A compound according to claim 1 wherein at least one L is X-A-Q; X is phenylene, A is S and Q is lower alkyl.

* * * * *